US012803264B2

(12) United States Patent
Purgat

(10) Patent No.: US 12,803,264 B2
(45) Date of Patent: Nov. 17, 2026

(54) HYBRID CIRCUIT BREAKER HAVING SNUBBER ARRANGEMENT CONNECTED TO NEUTRAL CONDUCTOR PATH

(71) Applicant: EATON INTELLIGENT POWER LIMITED, Dublin (IE)

(72) Inventor: Pavel Purgat, Vienna (AT)

(73) Assignee: EATON INTELLIGENT POWER LIMITED, Dublin (IE)

( * ) Notice: Subject to any disclaimer, the term of this patent is extended or adjusted under 35 U.S.C. 154(b) by 164 days.

(21) Appl. No.: 18/837,255

(22) PCT Filed: Feb. 10, 2023

(86) PCT No.: PCT/EP2023/025062
§ 371 (c)(1),
(2) Date: Aug. 9, 2024

(87) PCT Pub. No.: WO2023/151872
PCT Pub. Date: Aug. 17, 2023

(65) Prior Publication Data
US 2025/0149875 A1 May 8, 2025

(30) Foreign Application Priority Data
Feb. 11, 2022 (GB) ...................................... 2201758

(51) Int. Cl.
*H02H 3/02* (2006.01)
*H02H 9/04* (2006.01)

(52) U.S. Cl.
CPC ................ *H02H 3/02* (2013.01); *H02H 9/04* (2013.01)

(58) Field of Classification Search
CPC ............ H02H 3/02; H02H 9/04; H02H 9/025; H02H 3/087; H01H 9/548; H01H 9/542;
(Continued)

(56) References Cited

U.S. PATENT DOCUMENTS

2008/0174926 A1 7/2008 Evans et al.
2014/0313628 A1* 10/2014 Hafner ..................... H02H 3/22 361/91.5

(Continued)

FOREIGN PATENT DOCUMENTS

WO WO-2014177874 A2 * 11/2014 ............. H02H 7/222
WO WO-2021163795 A1 * 8/2021 ............. H01H 9/542

*Primary Examiner* — Sreeya Sreevatsa
(74) *Attorney, Agent, or Firm* — LEYDIG, VOIT & MAYER, LTD.

(57) ABSTRACT

Some embodiments are directed to a hybrid circuit breaker, a mechanical bypass switch and a voltage source arrangement disposed in an outer conductor path. A first semiconductor circuit arrangement can be connected in parallel to the mechanical bypass switch and the voltage source arrangement. The hybrid circuit breaker can include an electronic control unit and a current measuring arrangement, and a first snubber arrangement connected parallel to the first semiconductor circuit arrangement. The first snubber arrangement can be connected to the neutral conductor path, the hybrid circuit breaker being embodied to limit an electric current at the first outer conductor terminal to a predefined current level, and the control and driver unit being embodied to switch-off the mechanical bypass switch and activate the first semiconductor circuit arrangement to limit the electric current at the first outer conductor terminal.

8 Claims, 2 Drawing Sheets

(58) Field of Classification Search
CPC ....... H01H 2009/543; H01H 2009/544; H01H 9/541
USPC ........................................................ 361/91.5
See application file for complete search history.

(56) References Cited

U.S. PATENT DOCUMENTS

2015/0022928 A1* 1/2015 Mohaddes Khorassani ................ H01H 9/548 361/93.7
2020/0185904 A1 6/2020 Askan
2020/0194195 A1* 6/2020 Askan .................... H01H 9/548

* cited by examiner

HYBRID CIRCUIT BREAKER HAVING SNUBBER ARRANGEMENT CONNECTED TO NEUTRAL CONDUCTOR PATH

CROSS REFERENCE TO RELATED APPLICATIONS

This application is a national phase filing under 35 C.F.R. § 371 of and claims priority to PCT Application No. PCT/EP2023/025062, filed on Feb. 10, 2023, and claims the priority benefit under 35 U.S.C § 119 of British Patent Application No. GB 2201758,6, filed on Feb. 11, 2022. The contents of which are hereby incorporated in their entireties by reference.

FIELD

The present disclosure relates to a hybrid circuit breaker.

BACKGROUND

It is well known, that direct current (DC) grids or parts of DC devices connected to a grid comprise respective capacitors for stabilising the DC grid and/or as fast energy and/or power storing part. For industrial DC grids these capacitors have a very high capacitance, for example from 1 farad up to 10.000 farad, if the capacitors are supercapacitors. When activating such a DC grid, it is necessary to charge the capacitors prior to any operation of the DC grid. Capacitors act, load and reload, much faster than most other electric parts, especially much faster than accumulators. Especially at the beginning of loading capacitors of a grid, the current would be much higher than currents in this grid in normal operation. This current would be high enough to trip a circuit breaker like a short-circuit, and stops the further loading.

As the high loading currents and their possibility to trip a circuit breaker are known, different devices and ways to operate these devices are known to limit the current during the start of the operation of such DC grids. These well-known devices and/or operations are typically complicated and would need electrotechnical engineers to operate them.

SUMMARY

In an embodiment, the present disclosure provides a hybrid circuit breaker, comprising at least one outer conductor path from a first outer conductor terminal of the hybrid circuit breaker to a second outer conductor terminal of the hybrid circuit breaker, a neutral conductor path from a first neutral conductor terminal of the hybrid circuit breaker to a second neutral conductor terminal of the hybrid circuit breaker, and a mechanical bypass switch disposed in the outer conductor path. The hybrid circuit breaker further comprises a voltage source arrangement connected in series to the mechanical bypass switch, a first semiconductor circuit arrangement of the hybrid circuit breaker connected parallel to the mechanical bypass switch and the voltage source arrangement, an electronic control unit, and at least one current measuring arrangement disposed in the outer conductor path, the current measuring arrangement being connected with the electronic control unit. The hybrid circuit breaker further comprises a first snubber arrangement connected parallel to the first semiconductor circuit arrangement with a first port and a second port, the first snubber arrangement being connected to the neutral conductor path at a third port. The hybrid circuit breaker is embodied to limit an electric current at the first outer conductor terminal to a predefined current level. The electronic control unit is embodied to switch-off the mechanical bypass switch and activate the first semiconductor circuit arrangement to limit the electric current at the first outer conductor terminal.

DETAILED DESCRIPTION

It is an object of the presently disclosed subject matter to overcome the drawbacks of the state of the art by providing a hybrid circuit breaker with which it is possible to charge capacitors respectively capacitances of a system without tripping itself or another circuit breaker of the connected power supply grid, which is safe and could be operated in an easy way, is achieved.

According to the presently disclosed subject matter, the aforementioned object is solved by the features of claim 1.

The hybrid circuit breaker limits the current during charging of at least one capacitor respectively capacitance, especially during charging of the at least one capacitor. The hybrid circuit breaker provides a current which would be high enough to charge the capacitor and low enough that itself or another circuit breaker between the hybrid circuit breaker and the power supply grid would not react and switch off the connection to the power supply.

The hybrid circuit breaker can operate without a required human for operating it.

The hybrid circuit breaker saves the necessary current for the capacitors and the connection to the power supply and would limit the necessary time for starting, respectively operating the DC-grid after it was locked off.

The dependent claims describe further preferred embodiments of the presently disclosed subject matter.

The presently disclosed subject matter is described with reference to the drawings. The drawings show only exemplary embodiments of the presently disclosed subject matter.

Figure 1:
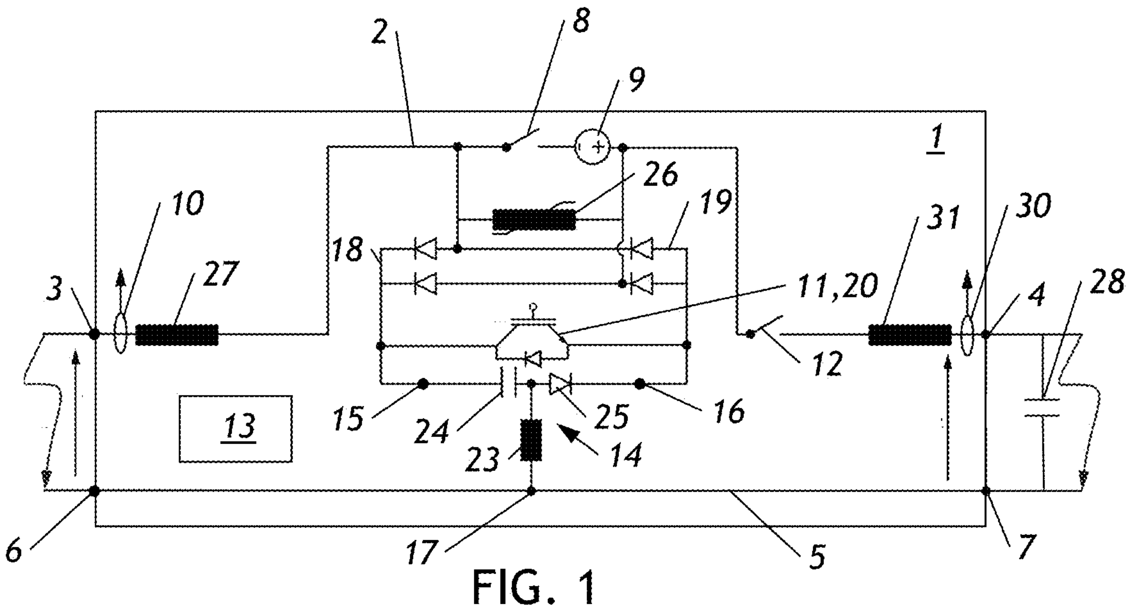
FIG. 1 illustrates an embodiment of a hybrid circuit breaker.
Figure 2:
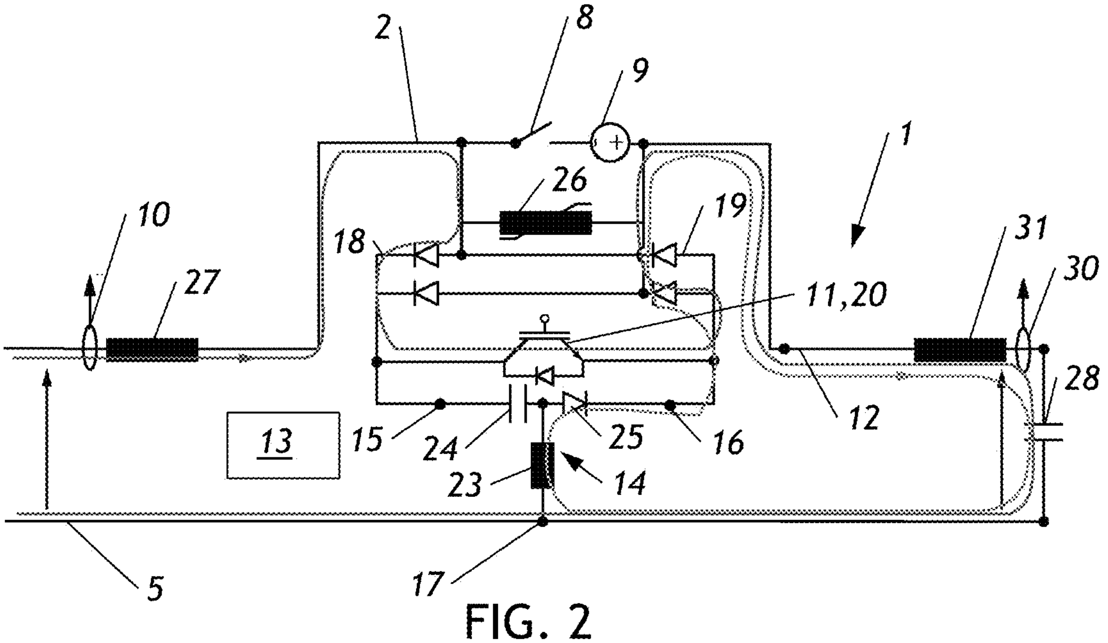
FIG. 2 illustrates the hybrid circuit breaker according to FIG. 1 in operation.
Figure 3:
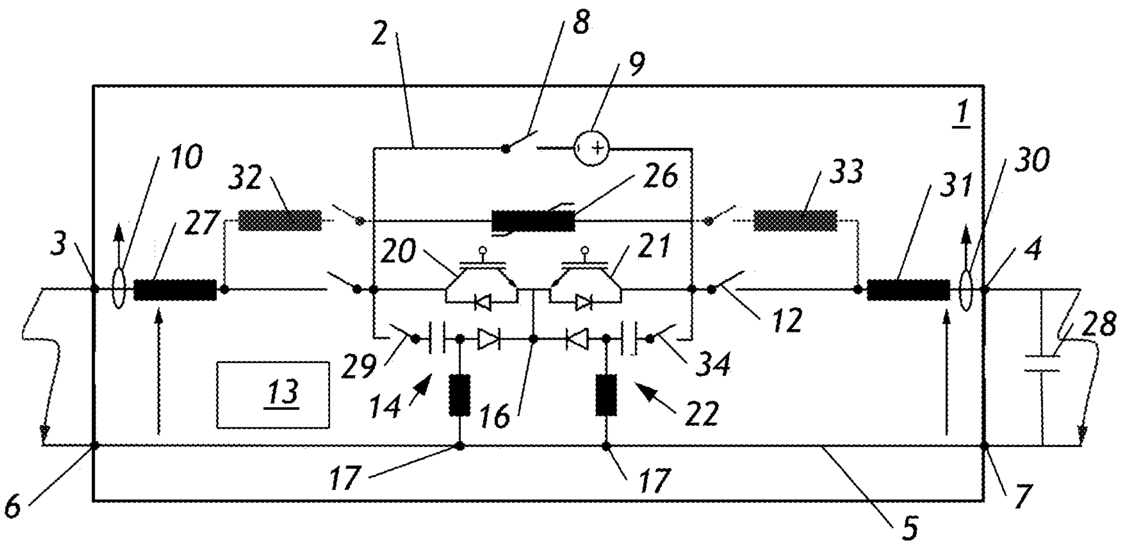
FIG. 3 illustrates an embodiment of a hybrid circuit breaker.

FIGS. 1 to 3 illustrate a hybrid circuit breaker 1, comprising:

- at least one outer conductor path 2 from a first outer conductor terminal 3 of the hybrid circuit breaker 1 to a second outer conductor terminal 4 of the hybrid circuit breaker 1,
- a neutral conductor path 5 from a first neutral conductor terminal 6 of the hybrid circuit breaker 1 to a second neutral conductor terminal 7 of the hybrid circuit breaker 1,
- a mechanical bypass switch 8 disposed in the outer conductor path 2,
- a voltage source arrangement 9 connected series to the mechanical bypass switch 8,
- a first semiconductor circuit arrangement 11 of the hybrid circuit breaker 1 connected parallel to the mechanical bypass switch 8 and the voltage source arrangement 9,
- an electronic control unit 13,
- a current measuring arrangement 10 disposed in the outer conductor path 2, the current measuring arrangement 10 being connected with the electronic control unit 13,
- a first snubber arrangement 14 connected parallel to the first semiconductor circuit arrangement 11 with a first port 15 and a second port 16, the first snubber arrangement 14 being connected to the neutral conductor path 5 at a third port 17, the hybrid circuit breaker 1 being embodied to limit an electric current at the first outer conductor terminal 3 to a predefined current level, and the electronic control unit 13 being embodied to switch-off the mechanical bypass switch 8 and activate the first semiconductor circuit arrangement 11 to limit the electric current at the first outer conductor terminal 3.

The hybrid circuit breaker 1 limits the current during charging of at least one capacitor 28. The hybrid circuit breaker 1 provides a current which would be high enough to charge the capacitor 28 and low enough that the hybrid circuit breaker 1 or another circuit breaker between the hybrid circuit breaker 1 and the power supply grid would not react and switch off the connection to the power supply.

The hybrid circuit breaker 1 can operate without a required human for operating it.

The hybrid circuit breaker 1 saves the necessary current for the capacitors 28 and the connection to the power supply and would limit the necessary time for starting, respectively operating the DC-grid after it was locked off.

A hybrid circuit breaker 1 is known from WO 2015/028634 A1 of the applicant. The hybrid circuit breaker 1 is preferably a low-voltage hybrid circuit breaker 1. Low voltage is, as usual, in the range up to 1000V alternating current (AC) and/or 1500V DC.

The hybrid circuit breaker 1 has at least one outer conductor path 2 and a neutral conductor path 5. For direct current, two conductor paths 2, 5 of different polarity are accordingly provided. The outer conductor path 2 extends through the hybrid circuit breaker 1 from a first outer conductor terminal 3 to a second outer conductor terminal 4. The neutral conductor path 5 extends through the hybrid circuit breaker 1 from a first neutral conductor terminal 6 to a second neutral conductor terminal 7. The respective connections 3, 4, 6, 7 are preferably each designed as screw connection terminals and/or plug-in terminals, and are arranged in the hybrid circuit breaker 1 in a manner allowing access from the outside.

The hybrid circuit breaker 1 preferably has—at least in sections—a housing of insulating material.

A mechanical bypass switch 8 is arranged in the outer conductor path 2. In an example embodiment, a voltage source arrangement 9 is arranged in the outer conductor path 2 and connected in series to the mechanical bypass switch 8.

Preferably, in the hybrid circuit breaker 1, a first mechanical disconnecting switch 12 is furthermore arranged in series with the bypass switch 8 in the outer conductor path 2. The mechanical disconnecting switches 12 serve to ensure galvanic isolation. The second embodiment according to FIG. 3 comprises further mechanical disconnection switches 12.

A first semiconductor circuit arrangement 11 is connected in parallel to the bypass switch 8 and the voltage source arrangement 9. The voltage source arrangement 9 is provided for helping to commute the current to the semiconductor circuit arrangement 11. The polarities of the voltage source arrangement 9 are such that the flow of current through the outer conductor path 2 is opposed, thus helping the commutation of the current to the semiconductor circuit arrangement 11. In an embodiment, the voltage source arrangement 9 is a semiconductor switching device, wherein the voltage drop across the semiconductor switching device is used as the source of voltage. Preferably, the voltage source arrangement 9 comprises at least one field-effect transistor, especially one MOSFET. Particularly the voltage source arrangement 9 is at least one MOSFET, especially only one MOSFET. Preferably the voltage source arrangement 9 is connected with the electronic control unit 13.

In an example embodiment, the voltage source arrangement 9 (e.g. the MOSFET) is triggered before the mechanical switch 8. Alternatively, it may be triggered simultaneously with the mechanical switch 8. Due to the inherent delay, the mechanical switch 8 opens later than the application of reverse voltage by the voltage source arrangement 9. In the meanwhile, due to the reverse voltage (for example, the voltage drop on the opening or open MOSFET), a lower current is handled by the mechanical switch, and thus, generation of arc is minimized. As soon as the mechanical switch opens, the flow of current from the first outer conductor terminal 3 to the second outer conductor terminal 4 is entirely commuted through the semiconductor circuit arrangement 11.

The semiconductor circuit arrangement 11 may include one or more semiconductor devices. It may even consist of only one or two semiconductor devices. The one or more semiconductor devices could be one or more bipolar transistors, MOSFETs, BJTs, SCRs, TRIAC or similar. In an example embodiment, the semiconductor circuit arrangement 11 comprises at least a first transistor 20. Preferably, the first transistor 20 is an IGBT. The semiconductor circuit arrangement 11 may further comprise a diode parallel to the first transistor 20.

The semiconductor circuit arrangement 11 is designed as a four-quadrant switch or part of a four-quadrant switch arrangement. According the first embodiment as shown in FIGS. 1 and 2 the hybrid circuit breaker 1 comprises a H-bridge 18 which is part of the first semiconductor circuit arrangement 11 and connected between the outer conductor path 2 and the first transistor 20. The H-bridge 18—as shown in FIGS. 1 and 2—is further a four diodes converter 19. This embodiment enables a four-quadrant functionality with one transistor 20.

The hybrid circuit breaker 1 comprises at least a first snubber arrangement 14 which is connected parallel to the first semiconductor circuit arrangement 11. The first snubber arrangement 14 comprises three parts: a resistor 23, a capacitance 24 and a diode 25, as shown in FIGS. 1 to 3. The resistor 23 is connected to the capacitance 24 and the diode 25. A first port 15 of the first snubber arrangement 14 is connected to a collector of the first transistor 20. A second port 16 of the first snubber arrangement 14 is connected to an emitter of the first transistor 20. A third port 17 of the first snubber arrangement 14 is connected to the neutral conductor path 5.

According to the second preferred embodiment as shown in FIG. 3, the first semiconductor circuit arrangement 11 comprises a second transistor 21, particularly an IGBT. The first transistor 20 and the second transistor 21 are connected to build a four-quadrant arrangement. A first emitter of the first transistor 20 is connected to a second emitter of the second transistor 21. A diode is connected parallel to the first transistor 20. A further diode is connected parallel to the second transistor 21.

The second preferred embodiment as shown in FIG. 3 comprise the first snubber arrangement 14 and a second snubber arrangement 22. The first and the second snubber arrangements 14, 22 are preferably embodied as the first snubber arrangement 14 according to the first embodiment. The first snubber arrangement 14 is connected parallel to the first transistor 20, with the capacitance 24 being connected to the collector of the first transistor 20 and the diode 25 being connected to the emitter of the first transistor 20. The resistor 23 of the first snubber arrangement 14 is connected to the neutral conductor path 5. The second snubber 22 is connected parallel to the second transistor 22, with the capacitance 24 being connected to the collector of the second transistor 21 and the diode 25 being connected to the emitter of the second transistor 21. The resistor 23 of the second snubber arrangement 22 is connected to the neutral conductor path 5. Further, the diode of the first snubber arrangement 14, respectively the first diode is connected to the diode of the second snubber arrangement 22, respectively the second diode of the second snubber arrangement 22.

The second preferred embodiment further comprises two snubber switches 29, 34. A first snubber switch 29 is arranged in the first snubber arrangement 14 serial to the capacitor 24 of the first snubber arrangement 14. In this case the first snubber switch 29 is the connection of the first snubber arrangement 14 and the collector of the first transistor 20. A second snubber switch 34 is arranged in the second snubber arrangement 22 serial to the capacitor of the second snubber arrangement 22. In this case the second snubber switch 34 is the connection of the second snubber arrangement 22 and the collector of the second transistor 21. The first and the second snubber switch 29, 34 are connected with the electronic control unit 13 and they are controlled by the electronic control unit 13.

Preferably, the hybrid circuit breaker 1 further comprises at least one varistor 26 which is connected parallel to the first semiconductor circuit arrangement 11. The varistor 26 is used to limit the overvoltage. Limiting the overvoltage is further one of the functionalities of the first and/or second snubber arrangement 14, 22.

The hybrid circuit breaker 1 comprises an electronic control unit 13, which preferably comprises a microcontroller and/or microprocessor. The electronic control unit 13 is designed to control the bypass switch 8 and the semiconductor circuit arrangement 11, as well further mechanical disconnection switches 12 and/or snubber switches 29, 34 of the hybrid circuit breaker 1. Details of the operation of the hybrid circuit breaker 1 are described in another paragraph.

The hybrid circuit breaker 1 comprises at least one current measuring arrangement 10, 30 disposed in the outer conductor path 2. The current measuring arrangement 10, 30 is connected to the electronic control unit 13. The first and the second preferred embodiment preferably comprise a first and a second current measuring arrangement 10, 30, which are both connected to the electronic control unit 13. The first current measuring arrangement 10 is arranged in the outer conductor path 2 near the first outer conductor terminal 3. The second current measuring arrangement 30 is arranged in the outer conductor path 2 near the second outer conductor terminal 4.

The hybrid circuit breaker 1 comprises at least a first inductor 27 arranged in the outer conductor path 2. Preferably, the hybrid circuit breaker 1 comprises a first inductor 27 arranged in the outer conductor path 2 near the first outer conductor terminal 3, and a second inductor arranged in the outer conductor path 2 near the second outer conductor terminal 4. The first and the second inductors 27, 31 are electric energy-storing-parts.

The second embodiment according to FIG. 3 further comprise a first and a second parallel path. The first parallel path comprises a third inductor 32 and a third mechanical disconnection switch. The second parallel path comprises a fourth inductor 33 and a fourth mechanical disconnection switch. Inductors also save electrical energy and they are as fast in their reaction time as capacitors.

The hybrid circuit breaker 1 is embodied to limit an electric current at the first outer conductor terminal 3 to a predefined current level. The hybrid circuit breaker 1 operates the mechanical bypass switch 8 and the first semiconductor circuit arrangement 11 for limiting the electric current. The mechanical bypass switch 8 would be opened and switched off. Thereafter the first semiconductor circuit arrangement 11 would be activated. The electronic control unit 13 is embodied to switch-off the mechanical bypass switch 8 and activate the first semiconductor circuit arrangement 11 to limit the electric current at the first outer conductor terminal 3.

Preferably, the first semiconductor circuit arrangement 11 is not only switched on, but modulated, to change the current and the resistance in different time phases. Modulated means especially to switch the first and/or second transistor 20, 21 completely on or off and/or to use the first and/or second transistor 20, 21 as variable resistor. The two current paths during this operation are shown in FIG. 2. If the first semiconductor circuit arrangement 11 is conducting the current flows only from the first outer conductor terminal 3 through the first transistor 20 to the second outer conductor terminal 4. If the first semiconductor circuit arrangement 11 is off the current flows through the first snubber 14, especially the resistor 23 and the diode 25 of the first snubber 14. The freewheeling path allows the energy to by transferred from the second inductor 31 to the capacitor 28. The current would be measured by the first and the second current measuring arrangement 10, 30. The controlling electronic control unit 13 preferably operates with a fixed hysteresis.

The snubber arrangements 14, 22, especially the resistor 23 and the diode 25, are connected to the neutral conductor path 5. This creates a freewheeling path for the current after the mechanical bypass switch 8 is switched off. This freewheeling path reduces the charging time of the capacitor 28, because the energy stored in the first or second inductor 27, 31 can discharge into the capacitor 28. The transfer of energy from one field respectively the first or second inductor 27, 31 to the other field, respectively the capacitor 28, is possible when the path for the current to flow between the first or second inductor 27, 31 and the capacitor 28 exists after the mechanical bypass switch 8 opens.

The first and the second embodiment of the hybrid circuit breaker 1 are both bidirectional. The first embodiment comprises a H-bridge 18. The second embodiment comprises a first and a second transistor 20, 21. The functionality for limiting the current are identical.

The time for loading of the capacitor 28 can be changed in the second embodiment by using the third inductor 32 and the fourth inductor 33 by using the third mechanical disconnection switch and the fourth mechanical disconnection switch. The third inductor 32 and the fourth inductor 33 can also be arranged in the first embodiment.

While the presently disclosed subject matter has been particularly shown and described with reference to exemplary embodiments thereof, it will be understood by those skilled in the art that various changes in form and details may be made therein without departing from the spirit and scope of the presently disclosed subject matter as defined by the appended claims. The exemplary embodiments should be considered as descriptive only and not for purposes of limitation. Therefore, the scope of the presently disclosed subject matter is not defined by the detailed description but by the appended claims.

Hereinafter are principles for understanding and interpreting the actual disclosure.

Features are usually introduced with an indefinite article "one, a, an". Unless otherwise stated in the context, therefore, "one, a, an" is not to be understood as a numeral.

The conjunction "or" has to be interpreted as inclusive and not as exclusive, unless the context dictates otherwise. "A or B" also includes "A and B", where "A" and "B" represent random features.

By means of an ordering number word, for example "first", "second" or "third", in particular a feature X or an object Y is distinguished in several embodiments, unless otherwise defined by the disclosure of the presently disclosed subject matter. In particular, a feature X or object Y with an ordering number word in a claim does not mean that an embodiment of the presently disclosed subject matter covered by this claim must have a further feature X or another object Y.

For ranges of values, the endpoints are included, unless the context dictates otherwise.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A hybrid circuit breaker, comprising:

at least one outer conductor path from a first outer conductor terminal of the hybrid circuit breaker to a second outer conductor terminal of the hybrid circuit breaker;

a neutral conductor path from a first neutral conductor terminal of the hybrid circuit breaker to a second neutral conductor terminal of the hybrid circuit breaker;

a mechanical bypass switch disposed in the outer conductor path;

a voltage source arrangement connected in series to the mechanical bypass switch;

a first semiconductor circuit arrangement of the hybrid circuit breaker connected parallel to the mechanical bypass switch and the voltage source arrangement;

an electronic control unit;

at least one current measuring arrangement disposed in the outer conductor path, the current measuring arrangement being connected with the electronic control unit; and a first snubber arrangement connected parallel to the first semiconductor circuit arrangement with a first port and a second port, the first snubber arrangement being connected to the neutral conductor path at a third port, the first snubber arrangement comprising a diode and a capacitor connected in series and a resistor connected in parallel with the diode and the capacitor, the resistor being connected between the diode and the capacitor and the neutral conductor path, wherein the hybrid circuit breaker is embodied to limit an electric current at the first outer conductor terminal to a predefined current level, and wherein the electronic control unit is embodied to switch-off the mechanical bypass switch and activate the first semiconductor circuit arrangement to limit the electric current at the first outer conductor terminal.

2. The hybrid circuit breaker according to claim 1, wherein, a H-bridge of the hybrid circuit breaker is part of the first semiconductor circuit arrangement.

3. The hybrid circuit breaker according to claim 2, wherein the H-bridge is embodied as four diodes converter.

4. The hybrid circuit breaker according to claim 1, wherein the voltage source arrangement comprises at least one MOSFET.

5. The hybrid circuit breaker according to one of the claim 1, wherein the first semiconductor circuit arrangement comprises a first transistor.

6. The hybrid circuit breaker according to claim 5, wherein the first semiconductor circuit arrangement comprises a second transistor, and wherein a first emitter of the first transistor is connected to a second emitter of the second transistor.

7. The hybrid circuit breaker according to claim 6, wherein the first snubber arrangement is connected parallel to the first transistor, wherein a second snubber arrangement is connected parallel to the second transistor, and wherein a first diode of the first snubber arrangement is connected to a second diode of the second snubber arrangement.

8. A hybrid circuit breaker, comprising:

at least one outer conductor path from a first outer conductor terminal of the hybrid circuit breaker to a second outer conductor terminal of the hybrid circuit breaker;

a neutral conductor path from a first neutral conductor terminal of the hybrid circuit breaker to a second neutral conductor terminal of the hybrid circuit breaker;

a mechanical bypass switch disposed in the outer conductor path;

a first semiconductor circuit arrangement comprising a first transistor and connected parallel to the mechanical bypass switch and a voltage source arrangement;

an electronic control unit;

at least one current measuring arrangement disposed in the outer conductor path, the current measuring arrangement being connected with the electronic control unit; and a first snubber arrangement connected parallel to the first semiconductor circuit arrangement with a first port and a second port, the first snubber arrangement being connected to the neutral conductor path at a third port, wherein the hybrid circuit breaker is configured to limit an electric current at the first outer conductor terminal to a predefined current level, wherein the electronic control unit is configured to switch-off the mechanical bypass switch and activate the first semiconductor circuit arrangement to limit the electric current at the first outer conductor terminal, wherein the first snubber arrangement is connected parallel to the first transistor, wherein a second snubber arrangement is connected parallel to a second transistor, and wherein a first diode of the first snubber arrangement is connected to a second diode of the second snubber arrangement.

* * * * *